(12) United States Patent
Tsuji

(10) Patent No.: US 7,630,387 B2
(45) Date of Patent: Dec. 8, 2009

(54) GATEWAY APPARATUS AND METHOD OF PROTECTION SWITCHING THEREOF

(75) Inventor: Kiyotaka Tsuji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 431 days.

(21) Appl. No.: 11/542,198

(22) Filed: Oct. 4, 2006

(65) Prior Publication Data

US 2007/0115952 A1    May 24, 2007

(30) Foreign Application Priority Data

Oct. 4, 2005    (JP)    ............................. 2005-291412

(51) Int. Cl.
*H04L 12/28* (2006.01)
*H04L 12/56* (2006.01)
*H04L 12/66* (2006.01)

(52) U.S. Cl. ........................ 370/401; 370/353; 370/355; 370/356

(58) Field of Classification Search ......... 370/352–356, 370/401
See application file for complete search history.

(56) References Cited

U.S. PATENT DOCUMENTS 6,389,005 B1 *  5/2002  Cruickshank ............... 370/352

6,542,599 B1 *  4/2003  Miyagawa ............. 379/221.03

FOREIGN PATENT DOCUMENTS

| JP | 2000-174748 | 6/2000 |
|---|---|---|
| JP | 2007-019831 | 1/2007 |

* cited by examiner

*Primary Examiner*—Ronald Abelson
(74) *Attorney, Agent, or Firm*—Finnegan, Henderson, Farabow, Garrett & Dunner, L.L.P.

(57) ABSTRACT

A gateway apparatus comprising signal converter has service line concentrating unit and protection line concentrating unit, packet switch has a plurality of IP converters each line-concentrated to service line concentrating unit and protection line concentrating unit, first monitor monitoring responses from the plurality of IP converters through service line concentrating unit and protection line concentrating unit, second monitor monitoring responses from the plurality of IP converters through paths deferring from those of first monitor, failure determiner determining presence or absence of failures in at least any one of service line concentrating unit, protection line concentrating unit and the plurality of IP converters on basis of presences or absences of responses monitored by first and second monitors, respectively, and switcher switching protection line concentrating unit to be in effect to operate it as new service system when failure determiner has determined that any failure is present in service line concentrating unit.

8 Claims, 5 Drawing Sheets

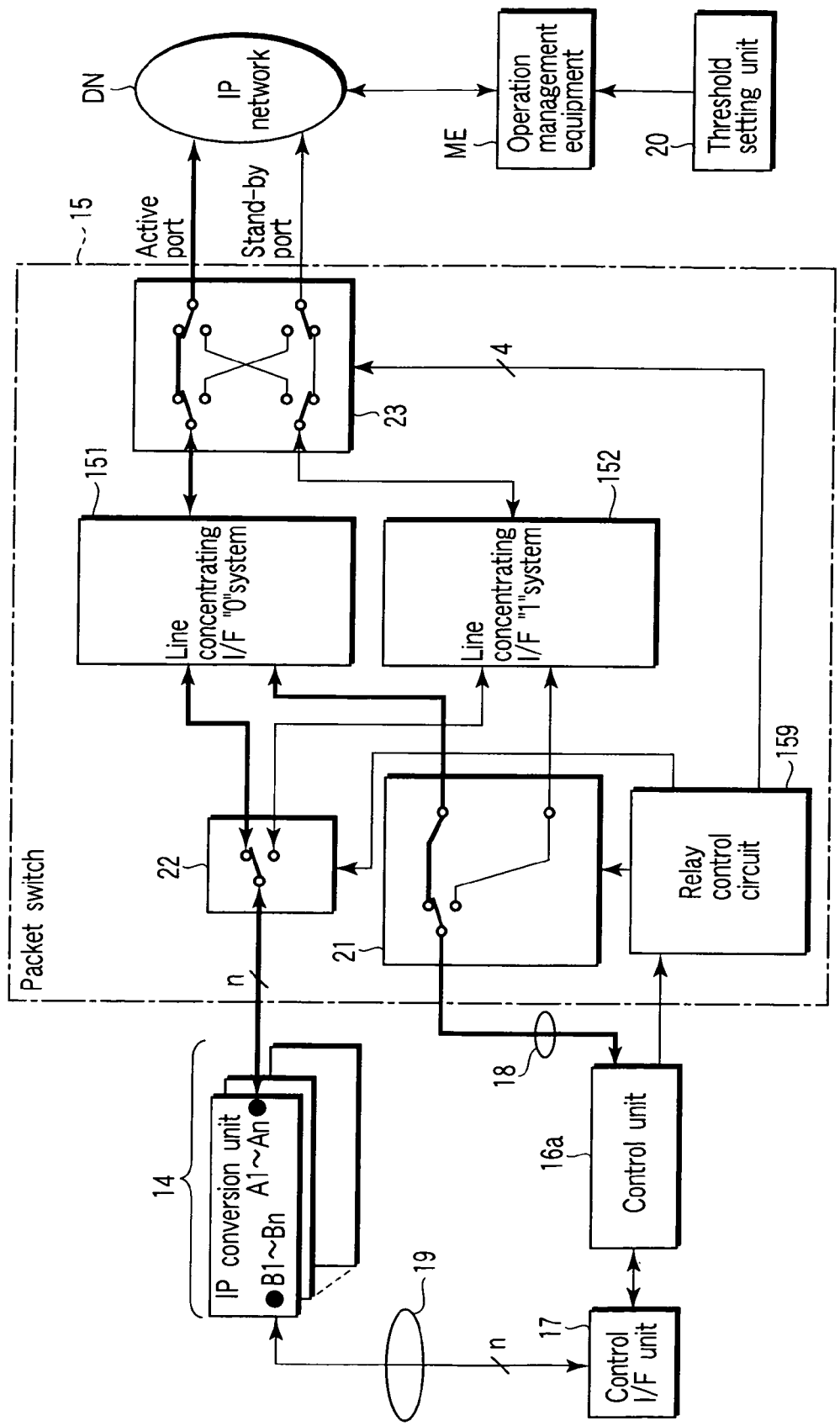
F I G. 5

| Port 1 | Mounted |
| Port 2 | Mounted |
| ....... | ....... |
| Port 6 | Mounted |
| Port 7 | Unmounted |
| ....... | ....... |
| Port n | Unmounted |

| m= | 4 |

US 7,630,387 B2

GATEWAY APPARATUS AND METHOD OF PROTECTION SWITCHING THEREOF

CROSS-REFERENCE TO RELATED APPLICATIONS

This application is based upon and claims the benefit of priority from prior Japanese Patent Application No. 2005-291412, filed Oct. 4, 2005, the entire contents of which are incorporated herein by reference.

BACKGROUND OF THE INVENTION

1. Field of the Invention

The present invention relates to a gateway apparatus connecting, for instance, a public switched telephone network (PSTN) and an Internet protocol (IP) network with each other.

2. Description of the Related Art

In recent years, information communication services including voices and data communications have been diversified with the increase in information communication needs and the development of communication liberalization. Such background has increased carriers who newly entered a communication service field in number and has made service competitions among carriers active. New carriers are call new comer carriers (NCCs) and provide a variety of services by using a technique such as a voice over Internet protocol (VoIP). The VoIP is a technique which packetizes digital vice data to transmit it so as to integrate a voice system network and a data system network.

Many NCCs take facilities such as exchanges on lease at predetermined charges from a specified carrier already having subscriber's lines. The NCCs mostly construct their own exchange networks, for instance, IP networks on their own accounts. Besides these constructions, communication systems are formed by also adding a public switched telephone network of the specified carrier. For proving services to ordinary users, the communication system utilizes such facilities multiply.

To connect different communication networks like the PSTN and the IP network with each other, the gateway apparatus is utilized. Such apparatus comprises an IP conversion unit converting voice data and binary data into IP packets; and a packet switch unit switching the IP packets. Each of these units functions a role as a network interface to the IP network. Jpn. Pat. Appln. KOKAI Publication No. 2000-174748 discloses a technique as a countermeasure against a failure in this interface unit.

By the way, in such an existing apparatus of this kind, a control unit monitors a status of a line concentrating interface connected to the IP conversion unit through a control interface. Then, the existing apparatus detects the failure in the line concentrating interface in the network interface. Therefore, if any abnormality occurs in the IP conversion unit itself, the existing apparatus cannot monitor the status of the line concentrating interface.

Between the line concentrating interface and the IP conversion unit, the existing apparatus can only determine that the line concentrating interface is abnormal on the grounds that all lines of set number in a service system are abnormal. Accordingly, even if the line concentrating interface are brought into protection, the existing apparatus cannot execute switching from service system to a protection system until all lines of set number in a service system become abnormal.

BRIEF SUMMARY OF THE INVENTION

The present invention is invented in accordance with the above-mentioned situations and an object of the invention is to provide a gateway apparatus improving redundancy and fault-tolerance performance and a method of protection switching of the apparatus.

According to an aspect of the present invention, there is provided a gateway apparatus converting communication protocols among a subscriber's network, a public switched telephone network (PSTN) and a packet communication network with one another to achieve mutual communications among these networks, comprising: a subscriber's network interface terminating the PSTN to generate in-apparatus signals; a PSTN interface terminating the PSTN to generate the in-apparatus signals; a signal conversion unit packetizing the in-apparatus signals output to the packet communication network; and a packet switch path-controlling packet signals output from the signal conversion unit to transmit them to a destination in the packet communication network, wherein the signal conversion unit has a service system line concentrating unit and a protection system line concentrating unit; and the packet switch has a plurality of Internet protocol (IP) conversion units each line-concentrated to the service system line concentrating unit and the protection system line concentrating unit, the apparatus further comprising: a first monitor unit monitoring responses from the plurality of the IP conversion units through the service system line concentrating unit and the protection system line concentrating unit; a second monitor unit monitoring the responses from the plurality of the IP conversion units through paths deferring from those of the first monitor unit; a failure determining unit determining the presence or absence of failures in at least any one of the service system line concentrating unit, the protection system line concentrating unit and the plurality of the IP conversion units on the basis of the presences or absences of the responses monitored by the first and the second monitor units, respectively; and a switching unit switching the protection system line concentrating unit to be in effect to operate it as a new service system when the failure determining unit has determined that any failure is present in the service system line concentrating unit.

With such measures taken, it becomes possible to detect failures on individual ports of an IP conversion unit 14 and it becomes possible to shorten failure time and prevent performance deterioration of a system as well as perform a failure recovery.

According to the present invention, the gateway apparatus with improved redundancy and fault-tolerance performance and the method of protection switching of the apparatus can be provided.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is an exemplary signal schematic view of a packet switch 15 and an IP conversion unit 14;

DETAILED DESCRIPTION OF THE INVENTION

Figure 1:
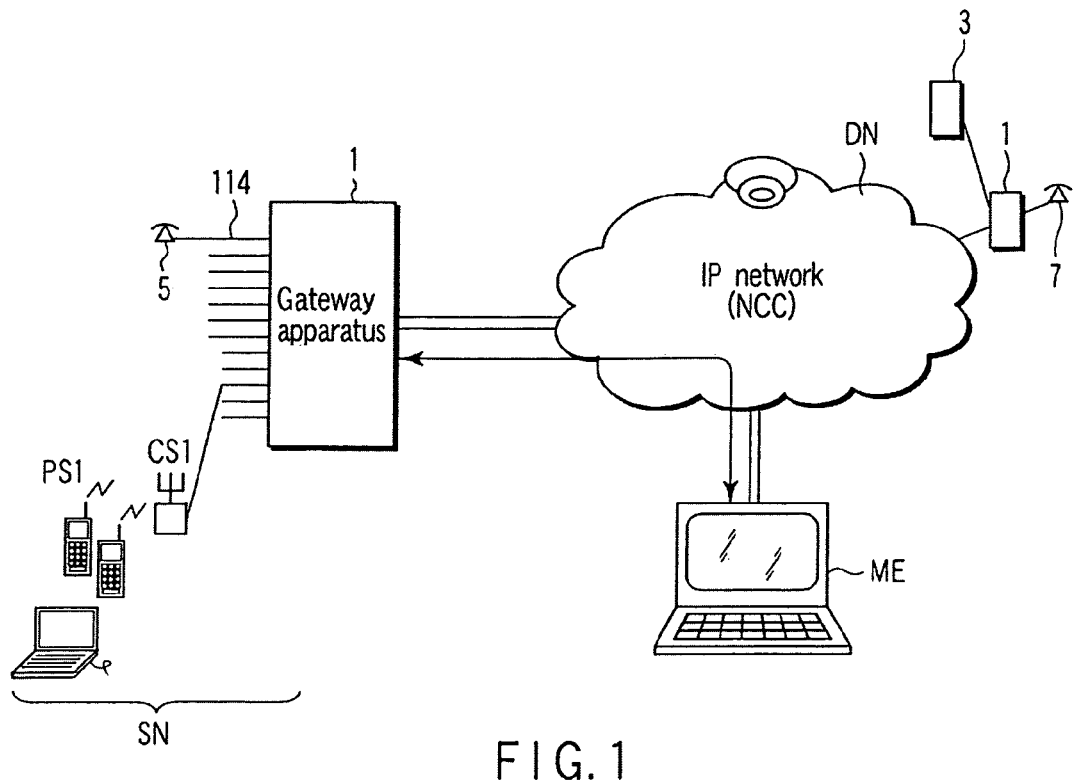
FIG. 1 is an exemplary system view showing an embodiment of a communication system regarding the present invention.

FIG. 1 is a system view illustrating an embodiment of a communication system regarding the present invention. In FIG. 1, a gateway apparatus 1 firstly houses a plurality of subscriber's lines 114 on a subscriber's network SN. The gateway apparatus 1 is connected to an IP network DN. IP network DN is a packet communication network and formed as a unique network, etc., of an NCC. The gateway apparatus 1 may also be connected to the Internet as the IP network DN.

The subscriber's network SN includes a subscriber's terminals 5, base stations CS1s of a mobile phone system, radio terminals PS1s, and the like. The subscriber's terminals 5 and the base stations CS1 are connected to the gateway apparatus 1 via the subscriber's lines 114. The subscriber's lines 114 are access lines assigned to each of a plurality of subscriber's terminals 5 and to each of the radio terminals PS1.

The gateway apparatus 1 transmits signals (digital data signals such as voice data, and video and image data), generated from the subscriber's network SN, to the IP network DN. The gateway apparatus 1 transmits signals destined to terminals in the subscriber's network SN from the IP network DN to the subscriber's network SN to make incoming calls to the corresponding terminals. Thereby, interactive communication paths among the subscriber's terminal 7 belonging to the IP network DN, subscriber's terminals 5 and the radio terminals PS1s may be set arbitrarily. Further, in the system shown in FIG. 1, the IP network DN is provided with network monitoring equipment ME. The monitoring equipment ME communicates a variety of items of information to and from the gateway apparatus 1 via the IP network DN and mainly manages an operation status of the gateway apparatus 1.

Figure 2:
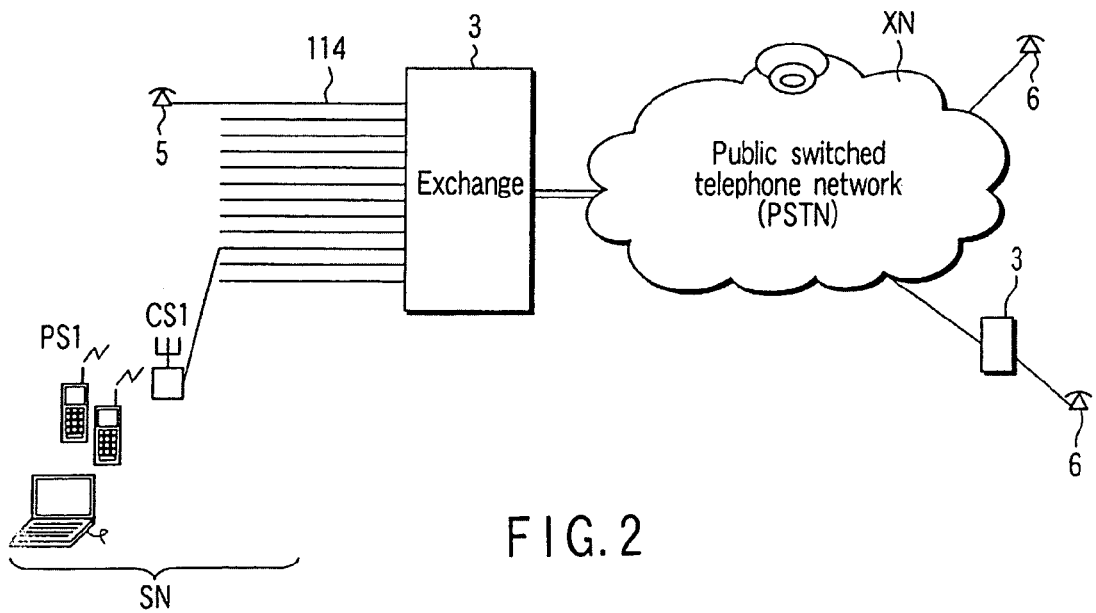
FIG. 2 is an exemplary system block diagram showing an existing voice communication system.

FIG. 2 is a system block diagram showing an existing voice communication system. In FIG. 2, an exchange 3 of a PSTN XN houses the subscriber's terminals 5 of the subscriber's network SN via the subscriber's lines 114. The exchange 3 is a facility belonging to the PSTN XN. In combining the system shown in FIG. 1 and the system shown in FIG. 2, the gateway apparatus 1 is disposed closer to the subscriber's terminals 5 than the exchange 3. Therefore, the inter-line connecting point between the subscriber's network SN and the PSTN XN becomes the connecting point between the gateway apparatus 1 and the exchange 3. That is, the gateway apparatus 1 is arranged closer to the subscriber's network SN than the inter-line connecting point between the subscriber's network SN and the line exchange network XN. Communication protocols among the subscriber's network SN, the PSTN XN and the IP network DN are different from one another.

Figure 3:
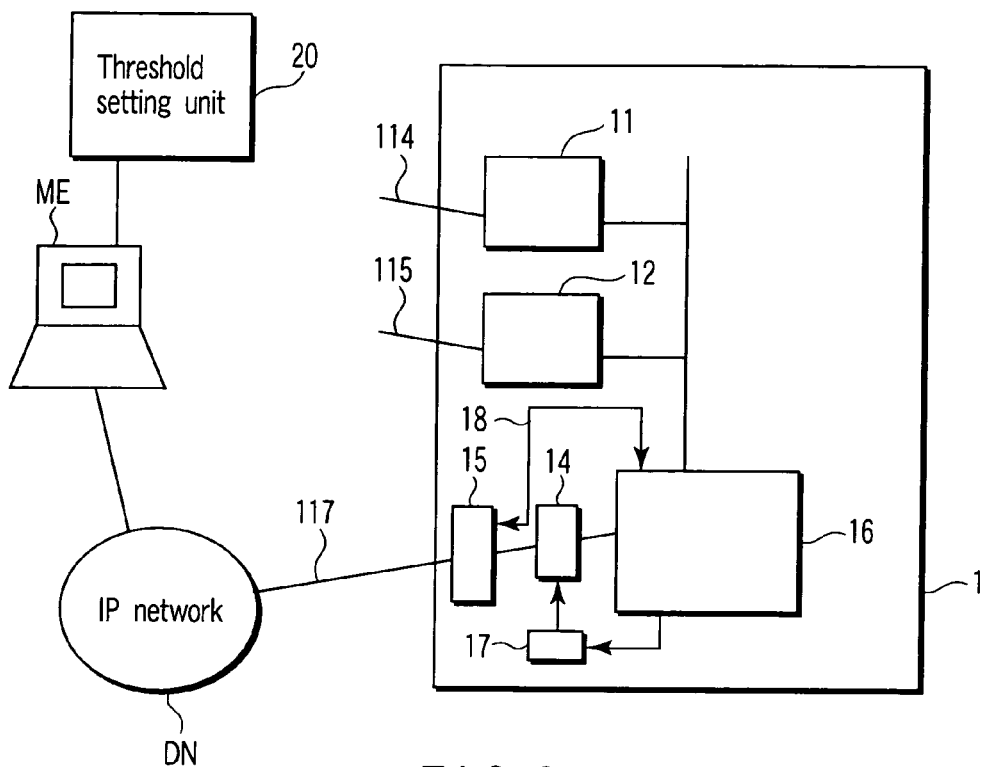
FIG. 3 is an exemplary functional block diagram showing an embodiment of a gateway apparatus 1 in FIG. 1.

FIG. 3 is a functional block diagram illustrating an embodiment of the gateway apparatus 1 shown in FIG. 1. In FIG. 3, the gateway apparatus 1 comprises a control unit 16, a subscriber's line interface 11, a public network interface 12 and a control interface (I/F) unit 17.

The subscriber's line interface 11 conducts interface control for the subscriber's lines 114 and the public line interface 12 conducts interface control for public lines 115. In other words, the subscriber's line interface 11 houses subscriber's terminals and the radio base station via the subscriber's lines 114 to provide an exchange station side interface for an integrated service digital network (ISDN). The public network interface 12 is connected to the public line 115 to provide a terminal side interface for the ISDN. Communication quantities of the public lines 115 are pre-designed on the basis of a demand forecast of traffic.

Further, the gateway apparatus 1 in FIG. 3 has an IP conversion unit 14 and a packet switch 15. The IP conversion unit 14 is disposed between the control unit 16 and the IP network DN to perform a protocol conversion between networks. Namely, the IP conversion unit 14 converts time division multiple signals supplied via another communication network (such as PSTN XN) into IP packets to input them to the packet switch 15. The IP packets are routed in accordance with destination IP addresses to be transmitted to the IP network DN through a local area network (LAN) cable 117. The IP conversion unit 14 converts the IP packets input from the IP network DN through the LAN cable 117 and the packet switch 15 into the time division multiple signals. The control unit 16 communicates a variety of pieces of information with the IP conversion unit 14 through a control interface unit 17. The packet switch 15 is connected to the control unit 16 via an external LAN 18.

In FIG. 3, the number of housed lines of the subscriber's lines 114 to be housed in the subscriber's line interface 11 is made equal to that of the public lines 115 to be housed in the public network interface 12, namely, the traffic. On the contrary, the number of housed lines of the subscriber's lines 114 to be housed in the subscriber's line interface 11 is made larger than that of the public lines 115 to be housed in the public network interface 12. Such configuration is advantageous to design the communication system.

The control unit 16 controls the whole of the gateway apparatus 1. That is to say, the control unit 16 requires control for the subscriber's lines 114 and the public lines 115 of the subscriber's line interface 11 and of the public network interface 12. Moreover, the control unit 16 comprehensively manages the failures detected by the subscriber's line interface 11 and by the public network interface 12.

The control unit 16 of the gateway apparatus 1 is connected to the network monitoring equipment ME via the IP network DN. The monitoring equipment ME communicates with the control unit 16 to displays the information, being comprehensively managed, on the side of the monitoring equipment ME then it may monitor and mange the gateway apparatus 1 remotely. Further, the monitoring equipment ME has a threshold setting unit 20. The setting unit 20 is used for inputting a threshold related to failure detection.

In FIG. 3, the control unit 16 is connected to the IP network DN through the IP conversion unit 14 and the packet switch 15. Every subscriber's line interface 11 and 12 and control unit 16 has a dedicated central processing unit (CPU) and a memory (not shown) and operates through each computing processing of each of the CPUs on the basis of programs stored each memory.

Figure 4:
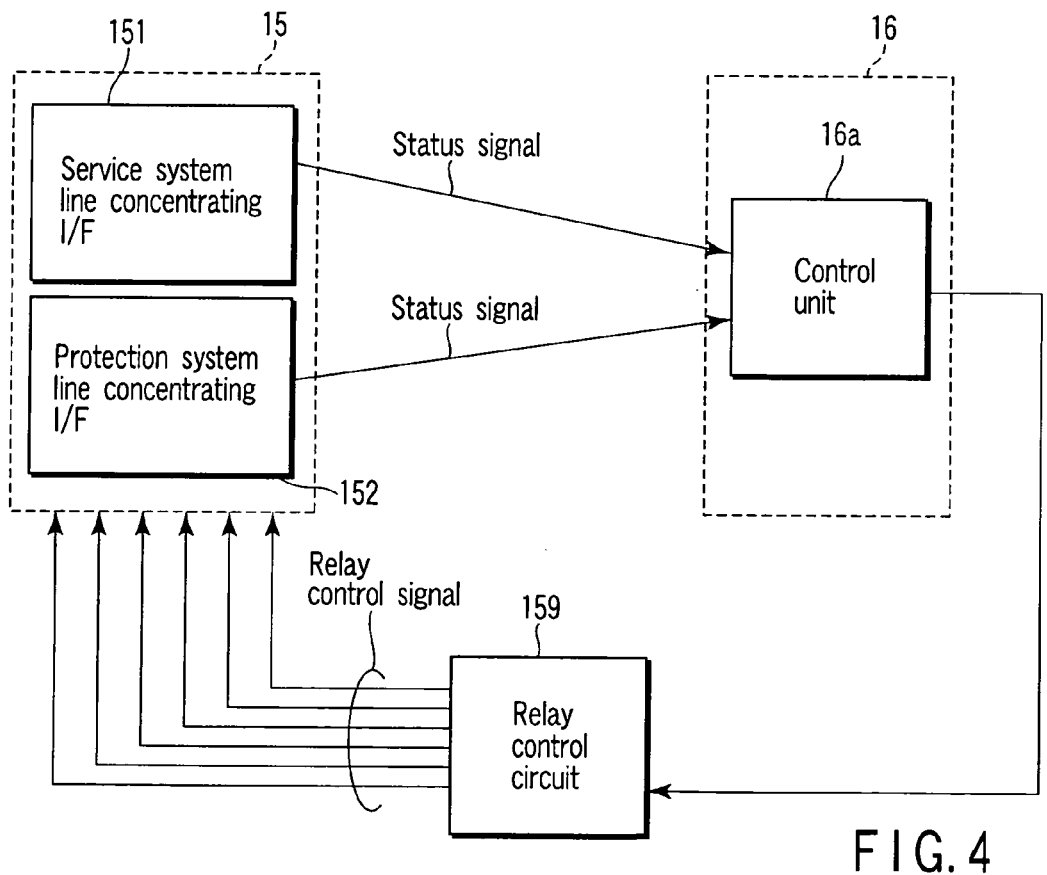
FIG. 4 is an exemplary block diagram showing a protection configuration of a control unit 16 and a packet switch 15 in FIG. 3.

FIG. 4 is a block diagram showing protection (redundancy) configurations of the control unit 16 and the packet switch 15 in FIG. 3. The packet switch 15 is constituted of a double structure of a service system line concentrating interface unit 151 and a protection system line concentrating interface unit 152. The control unit 16 has a control unit 16a. The line concentrating interface units 151 and 152 notify status signals indicating their own driving statuses to the control unit 16a in response to poling requests, etc, respectively. The control unit 16a recognizes the driving status of the packet switch 15 to supply a control signal based on the recognition result to a relay control circuit 159. The relay control circuit 159 outputs relay control signals to control switching of a plurality of relays (mentioned later) disposed in the packet switch 15 on the basis of the driving statuses of the line concentrating interface units 151 and 152.

FIG. 5 is a signal schematic view of the packet switch 15 and a plurality of conversion units 14. In FIG. 5, the packet switch 15 is connected to the IP network DN through an active port and a stand-by port. The active and the stand-by ports are connected to the line concentrating interface units 151 and 152 through a switch unit 23. On the other hand, the control unit 16a is connected to the line concentrating interface units 151 and 152 through an external LAN 18 and a switch unit 21. Furthermore, the line concentrating interface units 151 and 152 are connected to the plurality of the IP conversion units 14 through a switch unit 22. The IP conversion units 14 consist of a plurality of substrates possible to be inserted/extracted.

Each switch unit 21, 22 and 23 is, for instance, a relay and switch-controlled by control from a relay control circuit 159. The control unit 16a is connected to the plurality of the IP conversion units 14 from a service system control interface unit 17 through an internal LAN 19.

The plurality of the IP conversion units 14 in FIG. 5 are provided with status detection points via the external LAN 18 or the internal LAN 19. Out of them, detection points detecting statuses of the line concentrating interfaces 151 and 152 of the LAN switch, etc., via the external LAN 18 are set to A, and detection points detecting the statuses of the IP conversion units 14 through the internal control communication (internal LAN 19) or registers with the statuses stored therein are set to B. To distinguish the plurality of the IP conversion units 14, suffixes (1-n) are provided for the A and B. Each of the IP conversion unit 14 is connected to the switch unit 22 to switch over the connecting routes in accordance with the control from the relay control circuit 159.

Figures 6, 8, 9:
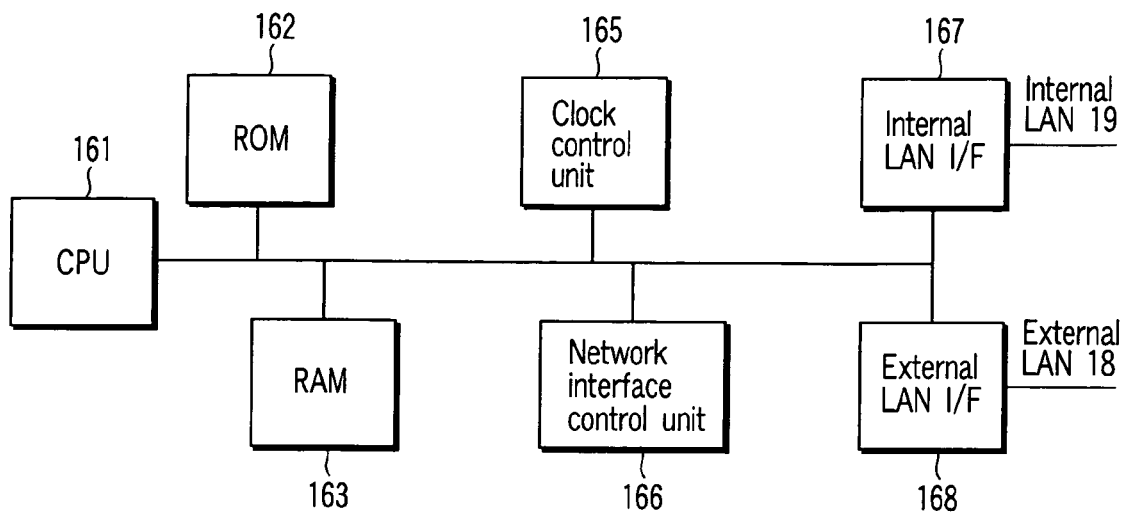
FIG. 6 is an exemplary functional block diagram showing a control unit 16a in FIG. 5.
FIG. 8 is an exemplary view showing an example of configuration information on the IP conversion unit 14 in the control unit 16.
FIG. 9 is an exemplary view showing a threshold (m) setting table for switching over a line concentrating interface in detecting a failure in the line concentrating interface.

FIG. 6 is a functional block view showing the control unit 16a. The control unit 16 integrally executes a variety of kinds of control regarding the operations of the gateway apparatus 1 through the processing of the control processor CPU 161 on the basis of control programs stored in a ROM 162 and a RAM 163. Specifically, the control unit 16 controls a connecting status of a communication path at a time division time switch (not shown) on the basis of the communication quantity of time division multi path connecting between the public network interface 12 and the time switch and of the communication quantity of the public line 115.

A clock control unit 165 selects an arbitrary subscriber's line as a clock master from the public network interface 12. The selected clock master is connected to the clock control unit 165 via a clock supply line to supply the master clock to the clock control unit 165. The clock control unit 165 generates inner clocks synchronizing with a network clock from the master clock. The inner clocks are distributed and supplied to each part of the gateway apparatus 1 through a clock distribution lines. Thereby, the gateway apparatus 1 operates in synchronization with the network clock.

In addition, the control unit 16a includes an internal LAN interface unit 167 to be connected to the internal LAN 19 and an external LAN interface unit 168 to be connected to the external LAN 18. These units are controlled by a network interface control unit 166.

In the configuration of FIG. 5, the control unit 16a outputs monitoring signals to each IP conversion unit 14 through the line concentrating interface unit 151 via the external LAN 18. Getting responses form the IP conversion units 14, the control unit 16a can determine that the lines of the corresponding to the line concentrating interface unit 151 are normal. If the lines are abnormal, the control unit 16a monitors the statuses of the IP conversion units 14 via the control unit interface unit 17. If the statuses of the IP conversion units 14 are normal, the control unit 16a determines that the interface unit 151 is abnormal, and on the contrary, if they are abnormal, it determines that the IP conversion units 14 are abnormal. When determining the occurrence of the abnormality in the active system line concentrating interface unit 151, the control unit 16a executes the protection switching to switch over from the active system line concentrating interface unit 151 to the protection system line concentrating interface unit 152.

Figure 7:
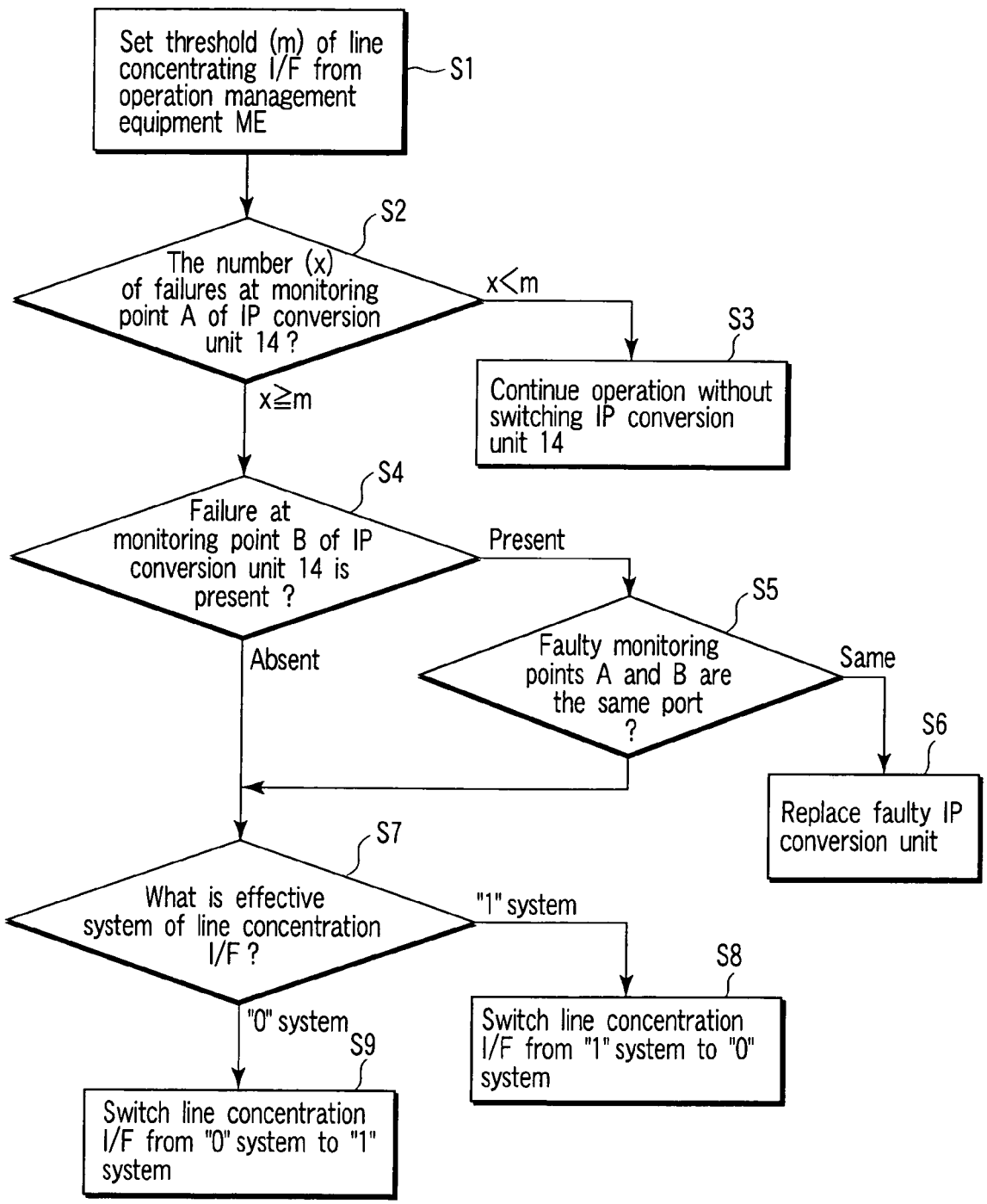
FIG. 7 is an exemplary flowchart showing operations of a gateway apparatus in an embodiment of the present invention.

FIG. 7 is a flowchart illustrating operations of the gateway apparatus in the embodiment. In FIG. 7, the gateway apparatus firstly sets a determination reference of the protection switching. That is, in starting up the system, the threshold setting unit 20 of the operation management equipment ME sets to perform the protection switching when the threshold of the protection switching of the line concentrating interface units 151 is set to (m) and when failures of (m) ports (m≦n) are detected (step S1). This setting is possible to be changed from the management equipment ME as needed also after starting up the system.

The number (x) of failures at the monitoring points A1-An of the plurality of the IP conversion units 14 are then monitored as needed via the external LAN 18, and if x<m, usual operations are continued without switching the protection (redundancy) (step S3). If x≧m, the presences/absences of the failures at the monitoring points B1-Bn of the plurality of the IP conversion units 14 are monitored through the internal LAN 19 (step S4). If there is no failure at the monitoring points B1-Bn, an effective system of the interface unit 151 is switched. Namely, if the service system is a "0" system, a "1" system becomes in effect. On the contrary, if the service system is the "1" system, the "0" system becomes in effect. Thereby, the protection switching between the line concentrating interface units 151 and 152 is executed appropriately (steps S7-S9). On the contrary, if there is any failure at the monitoring points B1-Bn in step S4, it is determined whether or not the monitoring ports A1-An and the monitoring ports B1-Bn are the same port (step S5). If they are the same port, since it is concluded that a failure has occurred, the IP conversion unit 14 having the failure should be replaced (step S6).

In the above-described procedures, it is supposed that the control unit 16a has detected failures more than (m) ports out of the monitoring points A1-An in a state that the line concentrating interface unit 151 is the service system. At this moment, the control units 16a presumes that the line concentrating interface unit 151 ("0" system) is abnormal to switch the switches 22 and 23 to switch the line concentrating interface unit 152 ("1" system) to the effective system when all the monitoring points B1-Bn are normal, or when the faulty ports of the monitoring points B1-Bn are not the same port as the faulty ports of the monitoring points A1-An.

In a status in which the line concentrating interface unit 151 is the active system, when any of the monitoring points B1-Bn is abnormal, the control unit 16a presumes that the corresponding IP conversion units 14 are abnormal and replaces the abnormal IP conversion units 14.

In contrast, in a status in which the line concentrating interface unit 152 is the active system, when the control unit 16a detects failures of not less than (m) ports out of monitoring points A1-An, and also when all the monitoring points B1-Bn are normal, or when the faulty ports of the monitoring points B1-Bn are not the same port as the faulty ports of the monitoring points A1-An, the control unit 16a presumes that the line concentrating interface unit 152 is abnormal to switch the switches 22 and 23 and it switches the line concentrating interface unit 151 into the effective system.

In the status where the line concentrating interface unit 152 is the service system, when any of the monitoring points B1-Bn is abnormal, the control unit 16a assumes that the corresponding IP conversion units 14 are abnormal to replace the IP conversion units 14.

FIG. 8 is a view illustrating an example of configuration information of the IP conversion unit 14 in the control unit 16. FIG. 9 shows a threshold (m) setting table to switch the line concentrating interface units 151 and 152 when any failure is detected at the line concentrating interface units 151 and 152. The number of mounted setting ports (n) of the IP conversion units 14 in the configuration information limits the inputs of the thresholds (m) so as to be $m \leq n$ is satisfied. In this example, n=6 and m=4. These values may be set by the operations from the management equipment ME. It is acceptable for the gateway apparatus 1 to directly set the values of (n) and (m). That is to say, the gateway apparatus 1 may locally set the values of (n) and (m). Further, the operations from the management equipment ME remotely enable the protection switching of the line concentrating interface units 151 and 152 to utilize the switching for failure classifications and maintenances. Accordingly, the gateway apparatus improved in its redundancy and fault-tolerance performance and the method of the protection switching of the apparatus can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gateway apparatus which converts protocols among a first network which transmits IP packets and a second network which transmits time division multiplexed signals, comprising:
   a packet switch connected to the first network;
   IP conversion units which convert the time division multiplexed signals from the second network into the IP packets, and input the IP packets to the packet switch;
   a service system line concentrating unit which is provided on the packet switch and concentrates first controlling lines connected to the IP conversion units;
   a protection system line concentrating unit which is provided on the packet switch and concentrates the first controlling lines;
   a first monitoring module which monitors responses from the IP conversion units through the service system line concentrating unit and the protection system line concentrating unit via the first controlling lines;
   a second monitoring module which monitors the responses from the IP conversion units via second controlling lines differing from the first controlling lines;
   a failure determining module which determines whether a failure occurs or not in the service system line concentrating unit based on the presence or absence of each of the responses monitored by the first monitoring module and the second monitoring module; and
   a switching unit which causes the protection system line concentrating unit to be available and to operate as a new service system when the failure determining unit has determined that the failure occurs in the service system line concentrating unit.

2. The gateway apparatus according claim 1, wherein
   a threshold of the number of ports, from which any response is not made, is set to (m),
   the failure determining module determines that the failure occurs at the service system line concentrating unit when a monitoring result from the first monitoring module shows that ports, the number of which is not less than the threshold (m), make no responses, and
   the threshold (m) is allowed to be preset.

3. The gateway apparatus according to claim 2, wherein when the first network is provided with operation management equipment, the operation management equipment may set the threshold (m).

4. The gateway apparatus according to claim 3 capable of executing switching control between the service system line concentrating unit and the protection system line concentrating unit from the operation management equipment.

5. A method of protection switching to be used for a gateway apparatus converting protocols among a first network transmitting IP packets and a second network transmitting time division multiplexed signals, wherein the gateway apparatus comprises:
   a packet switch connected to the first network;
   IP conversion units which convert the time division multiplexed signals from the second network into the IP packets, and input the IP packets to the packet switch;
   a service system line concentrating unit which is provided on the packet switch and concentrates first controlling lines connected to each of the IP conversion units;
   a protection system line concentrating unit which is provided on the packet switch and concentrates the first controlling lines;
   the method comprising:
   monitoring responses from the IP conversion units through the service system line concentrating unit and the protection system line concentration unit via the first controlling lines;
   monitoring the responses from the IP conversion units via second controlling lines differing from the first controlling lines;
   determining whether a failure occurs in the service system line concentrating unit based on the monitored presence or absence of the responses; and
   causing the protection system line concentrating unit to be available and operate as a new service system when it is determined that the failure occurs in the service system line concentrating unit.

6. The method of protection switching according to claim 5, further comprising:

setting a threshold of a number of ports from which any response is not made to (m);

determining that failure occurs at the service system line concentrating unit when a monitoring result from the first monitoring module shows that ports, the number of which is not less than the threshold (m), make no responses; and allowing the threshold (m) to be preset.

7. The method according to claim 6, when operation management equipment is provided for the first network, the method further comprising:

allowing the operation management equipment to set the threshold (m).

8. The method according to claim 7, further comprising:

allowing the operation management equipment to execute switching control between the service system line concentrating unit and the protection system line concentrating unit.

* * * * *

UNITED STATES PATENT AND TRADEMARK OFFICE
CERTIFICATE OF CORRECTION

PATENT NO. : 7,630,387 B2
APPLICATION NO. : 11/542198
DATED : December 8, 2009
INVENTOR(S) : Tsuji It is certified that error appears in the above-identified patent and that said Letters Patent is hereby corrected as shown below:

Claim 6, column 9, line 6, change "failure" to --the failure--.

Signed and Sealed this

Ninth Day of February, 2010

David J. Kappos
*Director of the United States Patent and Trademark Office*